United States Patent
Chou et al.

(10) Patent No.: US 10,626,021 B2
(45) Date of Patent: Apr. 21, 2020

(54) METHOD OF MAKING METAL AND METAL OXIDE NANOPARTICLES

(71) Applicant: HONDA MOTOR CO., LTD., Minato-ku, Tokyo (JP)

(72) Inventors: Nam Hawn Chou, Dublin, OH (US); Ryan McKenney, Upper Arlington, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 21 days.

(21) Appl. No.: 15/475,943

(22) Filed: Mar. 31, 2017

(65) Prior Publication Data
US 2018/0282173 A1 Oct. 4, 2018

(51) Int. Cl.
| | | |
|---|---|---|
| *C01G 3/02* | (2006.01) | |
| *B22F 1/00* | (2006.01) | |
| *B22F 9/24* | (2006.01) | |
| *B82Y 40/00* | (2011.01) | |
| *B22F 1/02* | (2006.01) | |

(52) U.S. Cl.
CPC .............. *C01G 3/02* (2013.01); *B22F 1/0018* (2013.01); *B22F 1/0088* (2013.01); *B22F 9/24* (2013.01); *B22F 1/02* (2013.01); *B22F 2999/00* (2013.01); *B82Y 40/00* (2013.01); *C01P 2002/72* (2013.01); *C01P 2004/34* (2013.01); *C01P 2004/64* (2013.01)

(58) Field of Classification Search
CPC .... C01G 3/02; C01P 2004/34; C01P 2004/64; B01J 8/0015; B01J 10/00
See application file for complete search history.

(56) References Cited

U.S. PATENT DOCUMENTS

| | | | | |
|---|---|---|---|---|
| 5,409,686 | A | * | 4/1995 | Mrusek .................. A01N 59/20 423/35 |
| 5,492,681 | A | | 2/1996 | Pasek et al. |
| 5,834,057 | A | | 11/1998 | Edelstein et al. |
| 7,566,436 | B2 | | 7/2009 | Lester et al. |
| 8,038,979 | B2 | | 10/2011 | Rhee et al. |

(Continued)

FOREIGN PATENT DOCUMENTS

| | | |
|---|---|---|
| JP | 2006-69880 A | 3/2006 |
| JP | 5227828 B2 | 7/2013 |

(Continued)

OTHER PUBLICATIONS

Nine, Md J., et al. "Highly productive synthesis process of well dispersed Cu2O and Cu/Cu2O nanoparticles and its thermal characterization." Materials Chemistry and Physics 141.2-3 (2013): 636-642.*

(Continued)

*Primary Examiner* — Richard M Rump
(74) *Attorney, Agent, or Firm* — Arent Fox LLP

(57) ABSTRACT

Methods for preparing solid metal oxide nanoparticles via controlled oxidation comprising preparing a plurality of metal nanoparticles, contacting the plurality of metal nanoparticles with an aqueous agent to provide metal oxide nanoparticles having a desired particle size, and removing the resulting metal oxide nanoparticles from the aqueous agent. Aspects of the present disclosure also relate to solid metal oxide nanoparticles obtained by this method.

12 Claims, 22 Drawing Sheets

(56) References Cited

U.S. PATENT DOCUMENTS

2013/0089739 A1     4/2013     Polshettiwar et al.
2015/0291439 A1    10/2015    Kinoshita et al.

FOREIGN PATENT DOCUMENTS

| | | |
|---|---|---|
| KR | 10-0620885 B1 | 9/2006 |
| KR | 10-0819517 B1 | 4/2008 |
| WO | WO 2013/061343 A1 | 5/2013 |
| WO | WO 2016/033519 A1 | 3/2016 |
| WO | WO 2016/095520 A1 | 6/2016 |

OTHER PUBLICATIONS

Vaseem, Mohammad, et al. "Parametric study of cost-effective synthesis of crystalline copper nanoparticles and their crystallographic characterization." Materials Chemistry and Physics 125.3 (2011): 334-341.*

Xu, Haolan, and Wenzhong Wang. "Template synthesis of multishelled Cu2O hollow spheres with a single-crystalline shell wall." Angewandte Chemie International Edition 46.9 (2007): 1489-1492.*

Prabhash, P. G., and Swapna S. Nair. "Synthesis of copper quantum dots by chemical reduction method and tailoring of its band gap." Aip Advances 6.5 (2016): 055003.*

Ram, S., and C. Mitra. "Formation of stable Cu2O nanocrystals in a new orthorhombic crystal structure." Materials Science and Engineering: A 304 (2001): 805-809.*

Cho, C., et. al., "Preparation and Analysis of Cu Nanopowder by Wire Explosion in Distilled Water," KIEE, vol. 59, No. 7, Jul. 2010.

Dhas, et al., "Synthesis, Characterization, and Properties of Metallic Copper Nanoparticles," XP-000765079, Chem. Mater., pp. 1446-1452, 1998.

Extended European Search Report of European Patent Application No. 18184924.5 dated Aug. 23, 2018.

Ram, S., et al, "Formation of stable Cu2O nanocrystals in a new orthorhombic crystal structure," Materials Science and Engineering A304-306, pp. 805-809, 2001.

* cited by examiner

METHOD OF MAKING METAL AND METAL OXIDE NANOPARTICLES

FIELD

The present disclosure relates to a method for preparing well-defined, solid metal oxide nanoparticles having a controllable particle size via controlled oxidation.

BACKGROUND

Metal-containing nanoparticles, particularly metal oxide nanoparticles, have attracted a great deal of attention for their utility in numerous applications, including their use in electrode materials and as catalysts in various chemical reactions. There are currently known methods in the art for synthesizing hollow metal oxide nanoparticles and/or metal oxide nanoparticles having a core@shell structure. However, there remains a need in the art for a facile, effective method for producing well-defined, solid metal oxide nanoparticles with a controllable particle size.

SUMMARY

Aspects of the present disclosure generally relate to methods for preparing solid metal oxide nanoparticles via controlled oxidation. The methods may include preparing a plurality of metal nanoparticles, contacting the plurality of metal nanoparticles with an aqueous agent to provide metal oxide nanoparticles having a desired particle size, and removing the resulting metal oxide nanoparticles from the aqueous agent. According to some aspects, the size of the nanoparticles may depend at least in part on the contact time between the metal nanoparticles and the aqueous agent. Aspects of the present disclosure also generally relate to solid metal oxide nanoparticles obtained by the methods disclosed herein.

BRIEF DESCRIPTION OF THE DRAWINGS

FIG. 3 shows an X-ray powder diffractogram corresponding to the nanoparticles obtained in Example 2a.

FIG. 10 shows a TEM image of the nanoparticles obtained in Example 4a.

FIG. 14 shows TEM images of the nanoparticles obtained in Comparative Example 3a.

FIG. 15 shows an X-ray powder diffractogram corresponding to the nanoparticles obtained in Comparative Example 3a.

DETAILED DESCRIPTION OF THE INVENTION

Figure 1:
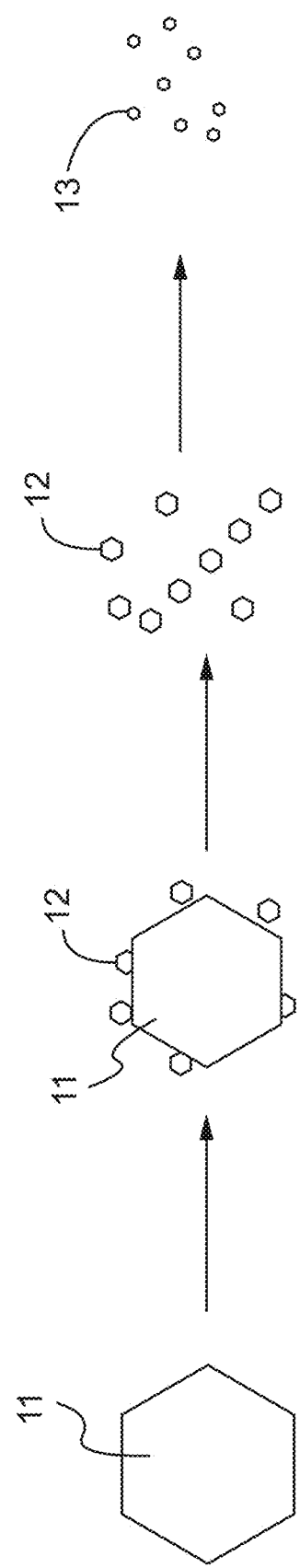
FIG. 1 shows an example of the formation of metal oxide nanoparticles according to aspects of the present disclosure.

Aspects of the present disclosure generally relate to methods for preparing solid metal oxide nanoparticles via controlled oxidation. The methods may include preparing a plurality of metal nanoparticles, contacting the plurality of metal nanoparticles with an aqueous agent to provide metal oxide nanoparticles having a desired particle size, and removing the resulting metal oxide nanoparticles from the aqueous agent. According to some aspects, the size of the nanoparticles may depend at least in part on the contact time between the metal nanoparticles and the aqueous agent. Aspects of the present disclosure also generally relate to solid metal oxide nanoparticles obtained by the methods disclosed herein.

One method, in accordance with aspects of the present disclosure, may include preparing a plurality of metal nanoparticles. In some aspects, the metal nanoparticles are produced by combining a metal precursor solution and a reducing agent solution to form the metal nanoparticles.

The metal precursor solution may be an aqueous solution comprising a metal component, a stabilizer, and water. In accordance with some aspects, the metal component may comprise a metal nitrate, a metal chloride, a metal sulfate, their salts, their hydrates, and combinations thereof. Examples of metals useful in the metal component according to the present disclosure include, but are not limited to, iron, cobalt, nickel, copper, lead, and combinations and/or alloys thereof. In a preferred aspect, the metal is copper. According to some aspects, the metal component may comprise $Cu(NO_3)_2$ and/or hydrates thereof.

In some aspects, the metal component may be present in the metal precursor solution at a concentration of from about 0.1 to 50 M, preferably from about 10 to 40 M, and more preferably from about 20 to 30 M.

In some aspects, the stabilizer may be one that prevents or otherwise inhibits oxidation of the metal nanoparticles during synthesis, but subsequently allows for fragmentation and/or oxidation of the metal nanoparticles under oxidizing conditions to form smaller, solid metal nanoparticles having well-shaped and distinctive structures. For example, stabilizers such as polyvinylpyrrolidone do not allow for subsequent fragmentation or oxidation of the metal nanoparticles to form smaller and distinctive structures. Without being limited to a particular theory, stabilizers such as polyvinylpyrrolidone are bulky (molecular weight of 55,000 g/mol) and inhibit further oxidation in part to an electronic interaction between the metal surface and the nitrogen and/or oxygen available for binding. In a non-limiting example, the stabilizer may comprise one or more components having a molecular weight (either individually or a weight average) of less than 1000 g/mol, optionally less than 500 g/mol, optionally less than 375 g/mol, and optionally less than 350 g/mol. Illustrative examples include hexadecyltrimethylammonium bromide (CTAB) with a molecular weight of 364 g/mol, citric acid with a molecular weight of 192 g/mol, their hydrates, and combinations thereof.

In some aspects, the stabilizer may be present in the metal precursor solution at a concentration of from about 0.1 to 50 M, preferably from about 10 to 40 M, and more preferably from about 20 to 30 M.

The metal precursor solution may be combined with a reducing agent solution to form the metal nanoparticles. In some aspects, the reducing agent solution may be an aqueous solution comprising a reducing agent, a stabilizer, and water.

As used herein, the term "reducing agent" refers to a substance that causes the reduction of another substance, while it itself is oxidized. Reduction refers to a gain of electron(s) by a chemical species, and oxidation refers to a loss of electron(s) by a chemical species. In some aspects, the reducing agent may be selected from the group consisting of hydrazine, sodium borohydride, sodium cyanoborohydride, sodium dithionate, sodium dithionite, iron (II) sulfate, tin (II) chloride, potassium iodide, oxalic acid, formic acid, ascorbic acid, thiosulfate salts, dithionate salts, phosphorous acid, phosphite salts, hypophosphite salts, their hydrates, and combinations thereof. In a preferred aspect, the reducing agent may comprise hydrazine hydrate.

In some aspects, the reducing agent may be present in the reducing agent solution at a concentration of from about 0.01 to 10 M, preferably from about 0.01 to 5 M, and more preferably from about 0.01 to 1 M.

The stabilizer used in the reducing agent solution may be any of the stabilizers disclosed herein. In some aspects, the stabilizer may comprise a first component and a second component, for example, CTAB and citric acid monohydrate.

In some aspects, the total amount of stabilizer present in the reducing agent solution may be from about 0.1 to 50 M, preferably from about 10 to 40 M, more preferably from about 20 to 30 M, and most preferably from about 25 to 30 M. For example, the first component of the stabilizer may be present in the reducing agent solution at a concentration of from about 0.1 to 50 M, preferably from about 10 to 40 M, more preferably from about 20 to 30 M, and most preferably from about 20 to 25 M, while the second component of the stabilizer may be present in the reducing agent solution at a concentration of from about 0.01 to 20 M, preferably from about 0.01 to 10 M, and more preferably from about 0.01 to 5 M.

The reducing agent solution may be aged prior to its combination with the metal precursor solution. As used herein, the phrase "to age" refers to storing a solution in an atmosphere after the solution has been prepared. In some aspects, the reducing agent solution may be aged in an inert atmosphere. As used herein, the term "inert atmosphere" refers to a gaseous mixture that contains little or no oxygen and comprises inert or non-reactive gases or gases that have a high threshold before they react. An inert atmosphere may be, but is not limited to, molecular nitrogen or an inert gas, such as argon, or mixtures thereof.

In some aspects, the reducing agent solution may be aged from about 5 minutes to 2 hours, preferably from about 5 minutes to 1 hour, more preferably from about 15 minutes to 45 minutes, and most preferably for about 20 minutes.

After the reducing agent solution has been aged, it may be combined with the metal precursor solution. For example, in some aspects the metal precursor solution may be added to the reducing agent solution. In some aspects, the metal precursor solution may be combined with the reducing agent solution in an inert atmosphere and may be combined at room temperature. As used herein, "room temperature" refers to a temperature in the range of about 20 to 25° C.

Once the reducing agent solution and the metal precursor solution have been combined, the combined solution may be allowed to stir to form the metal nanoparticles. In some aspects, the combined solution may be stirred in an inert atmosphere and/or may be stirred from about 5 minutes to about 4 hours, preferably from about 1 hour to about 3 hours, and more preferably from about 90 minutes to 2.5 hours. The resulting metal nanoparticles may then be isolated (e.g., by centrifuge) and/or removed from the supernatant and/or washed (e.g., with an alcohol).

The resulting metal nanoparticles may be solid and may have a first particle size. In some aspects, the first particle size may correspond to a diameter of from about 1 to 500 nm, preferably from about 1 to 250 nm, more preferably from about 25 to 200 nm, even more preferably from about 25 to 100 nm, and most preferably from about 25 to 75 nm. In some preferred aspects, the first particle size may correspond to a diameter of about 50 nm.

The methods of the present disclosure may include contacting the plurality of metal nanoparticles with an aqueous agent to provide metal oxide nanoparticles having a desired particle size. In some aspects, the metal nanoparticles may be contacted with the aqueous agent under an inert atmosphere or under air, and may be contacted at room temperature. As used herein, the term "air" refers to the environment naturally surrounding the earth, i.e., a mixture primarily of oxygen and nitrogen along with argon, carbon dioxide, and other gases.

In some aspects, the plurality of metal nanoparticles may be dispersed in the aqueous agent and stirred, wherein the aqueous agent at least partially converts the metal of the metal nanoparticles to a metal oxide. Without being limited to any particular theory, the aqueous agent may provide a controlled oxidation reaction which acts to at least partially reverse the process by which the metal nanoparticles are formed. That is, adding the metal nanoparticles to the aqueous agent may disassemble the nanoparticles by a process that is the reverse of the process by which they were formed.

In some aspects, the aqueous agent may comprise water with or without additional components. In some aspects, the aqueous agent may consist of only water.

The resulting metal oxide nanoparticles may comprise or consist of an oxide of the metal comprised by the metal nanoparticles. Examples of metal oxides useful according to the present disclosure include, but are not limited to, FeO, $Fe_2O_3$, CoO, $Co_2O_3$, NiO, $Ni_2O_3$, $Cu_2O$, CuO, $Cu_2O_3$, PbO, $Pb_3O_4$, and combinations thereof. In a preferred aspect, the metal oxide may consist of $Cu_2O$.

The plurality of metal nanoparticles and the aqueous agent may have a predetermined contact time. As used herein, the term "contact time" refers to the amount of time the metal nanoparticles and the aqueous agent are in contact, for example, the amount of time the metal nanoparticles and the aqueous agent are stirred together. In some aspects, the contact time may be about 5, 15, 30, 45, 60, 75, or 90 minutes, or may be longer, for example, 12, 18, 24, 32, or more hours.

The resulting metal oxide nanoparticles may have a second particle size. In some aspects, the second particle size is smaller than the first particle size. That is, combining the metal nanoparticles with the aqueous agent may reduce the nanoparticles' size. For example, as shown in FIG. 1, contacting a metal nanoparticle (11) with the aqueous agent may form smaller metal oxide nanoparticles (12). In some aspects, the second particle size may depend, at least in part, on the contact time. In some aspects, longer contact times may result in nanoparticles with a smaller second particle size (13) than the nanoparticles obtained from shorter contact times (12).

In some aspects, the second particle size may correspond to a diameter of from about 1 to 50 nm, preferably from 1 to 25 nm, and more preferably from about 1 to 10 nm. For example, metal oxide nanoparticles corresponding to a one hour contact time may have a diameter of about 7 nm, whereas metal oxide nanoparticles corresponding to a 24 hour contact time may have a diameter of from about 2 to 4 nm. It should be understood that a desired metal oxide nanoparticle size can be provided, at least in part, by selecting the appropriate contact time.

The metal oxide nanoparticles according to the present disclosure are solid, that is, are not hollow. In some aspects, the metal oxide nanoparticles can be arranged in order to provide an artificial hollow shape. As used herein, the term "artificial hollow shape" refers to an arrangement of two or more solid nanoparticles such that together, the two or more solid nanoparticles form a shape that is hollow.

According to some aspects, an artificial hollow shape may result, at least in part, from secondary components of the aqueous agent (i.e., components other than water). For example, the secondary component may comprise a stabilizer such as CTAB. According to some aspects, the aqueous agent may consist of only water and a stabilizer, for example, only water and CTAB.

The secondary component may be present in the aqueous agent at a concentration of from about 0.01 to 10 M, preferably from about 0.01 to 5 M, more preferably from about 0.01 to 2.5 M, and most preferably from about 0.01 to 1 M.

After the predetermined contact time, the resulting metal oxide nanoparticles may be isolated (e.g., by centrifuge) and/or removed from the supernatant and/or washed (e.g., with an alcohol) to provide a plurality of metal oxide nanoparticles.

In some aspects, the aqueous agent may be replaced, for example, by air. For example, instead of contacting the metal nanoparticles with the aqueous agent, in some aspects, the metal nanoparticles may be exposed to air, wherein the air at least partially converts the metal of the metal nanoparticles to a metal oxide. In this example aspect, the resulting solid metal oxide nanoparticles may have a second particle size similar to metal oxide nanoparticles obtained using the aqueous agent (i.e., wherein the second particle size is smaller than the first particle size). The second particle size may depend, at least in part, on the contact time between the metal nanoparticles and air. In some aspects, longer contact times may result in smaller metal oxide nanoparticles. In some aspects, the rate of the metal nanoparticles' oxidation in air is slower than the rate of the metal nanoparticles' oxidation when contacted with the aqueous agent.

Aspects of the present disclosure also relate to metal oxide nanoparticles obtained by the methods disclosed herein. The metal oxide nanoparticles may be monodispersed or polydispersed, and may have one or more shapes, such as an octahedral shape, a spherical shape, a cubic shape, and combinations thereof. In some preferred aspects, the plurality of metal oxide nanoparticles obtained by the methods disclosed herein will have a homogeneous shape and/or size.

The metal oxide nanoparticles of the present disclosure may be used in a number of different applications, for example, as material in an anode and/or cathode used for $CO_2$ conversion (e.g., for oxygen evolution reactions or hydrogen evolution reactions), and/or as a catalyst in a variety of chemical reactions (e.g., in the Fischer-Tropsch process). The metal oxide nanoparticles of the present disclosure may also be subjected to further processing. For example, the metal oxide nanoparticles may be reduced by various methods (e.g., electrochemical and/or chemical reduction) to form metal nanoparticles.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

EXAMPLES

Example 1: Synthesis of Copper Nanoparticles

Hydrazine hydrate (50-60%, 3 mL, 0.43 M) was added to a stirring solution of CTAB (0.68 g, 1.87 mmol) and citric acid monohydrate (0.08 g, 0.38 mmol) in water (75 mL, DI) under argon at 23° C. to provide a reducing agent solution. The reducing agent solution was allowed to age for 20 minutes under argon. $NH_4OH$ (0.5 mL, 14.5 M) was added to a solution of $Cu(NO_3)_2.2.5H_2O$ (0.465 g, 2 mmol) and CTAB (0.68 g, 1.87 mmol) in water (75 mL, DI) to provide a metal precursor solution.

The metal precursor solution was immediately poured into the reducing agent solution and this mixture was stirred under argon for 2 hours. The resulting copper nanoparticles were isolated via centrifuge (12,000 rpm for 5 minutes), the supernatant was discarded, and the copper nanoparticles were washed with ethanol twice. The resulting copper nanoparticles were solid and had a diameter of about 50 nm.

Figure 2:
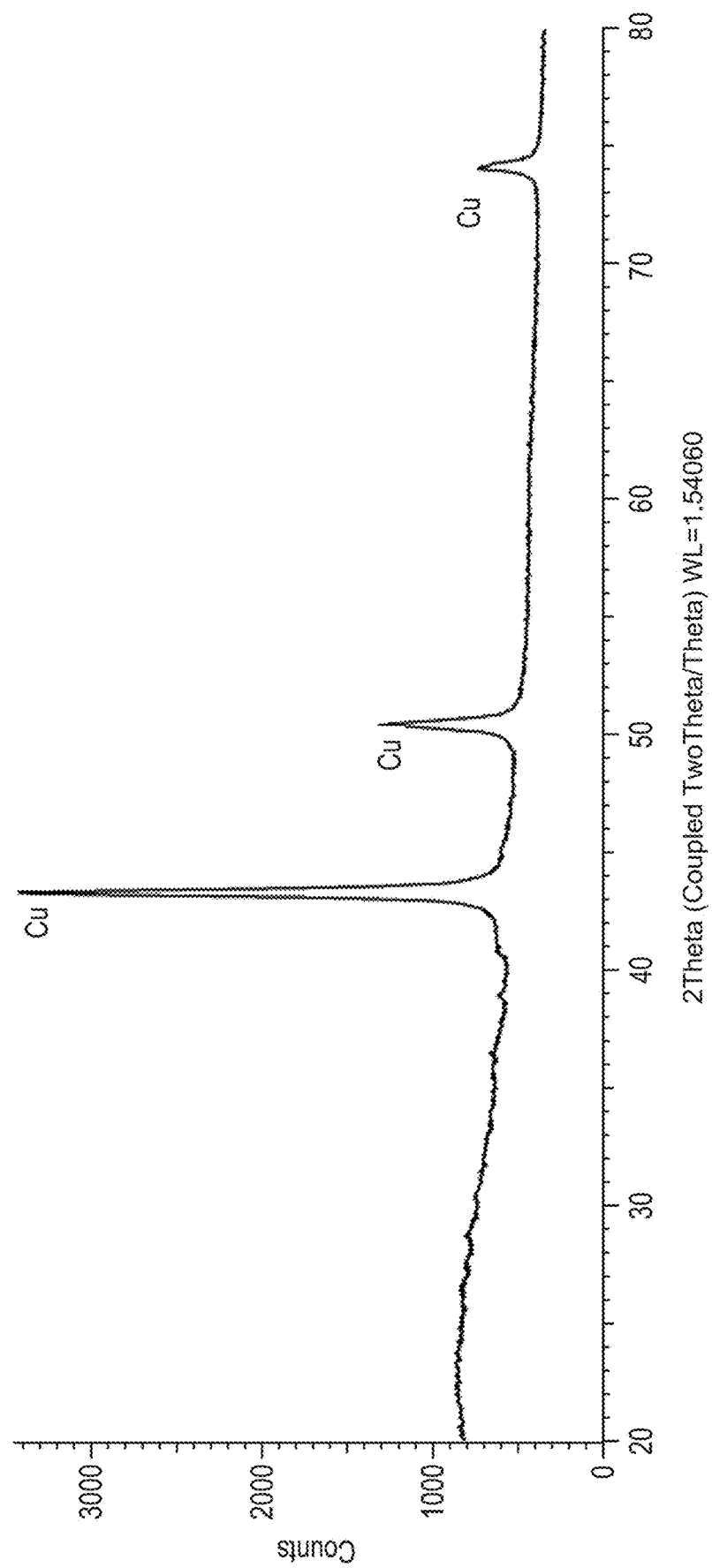
FIG. 2 shows an X-ray powder diffractogram corresponding to the copper nanoparticles prepared according to Example 1.

FIG. 2 shows an X-ray powder diffractogram corresponding to the copper nanoparticles prepared according to Example 1.

Example 2a: Partial Oxidation of Copper Nanoparticles

The copper nanoparticles (about 100 mg) obtained in Example 1 were redispersed in an aqueous agent consisting of water (100 mL) and CTAB (0.5 mmol) at 23° C. The solution was stirred for 15 minutes and then an aliquot was removed. The aliquot was centrifuged, the supernatant was discarded, and the resulting nanoparticles were washed with ethanol twice.

Figure 3:
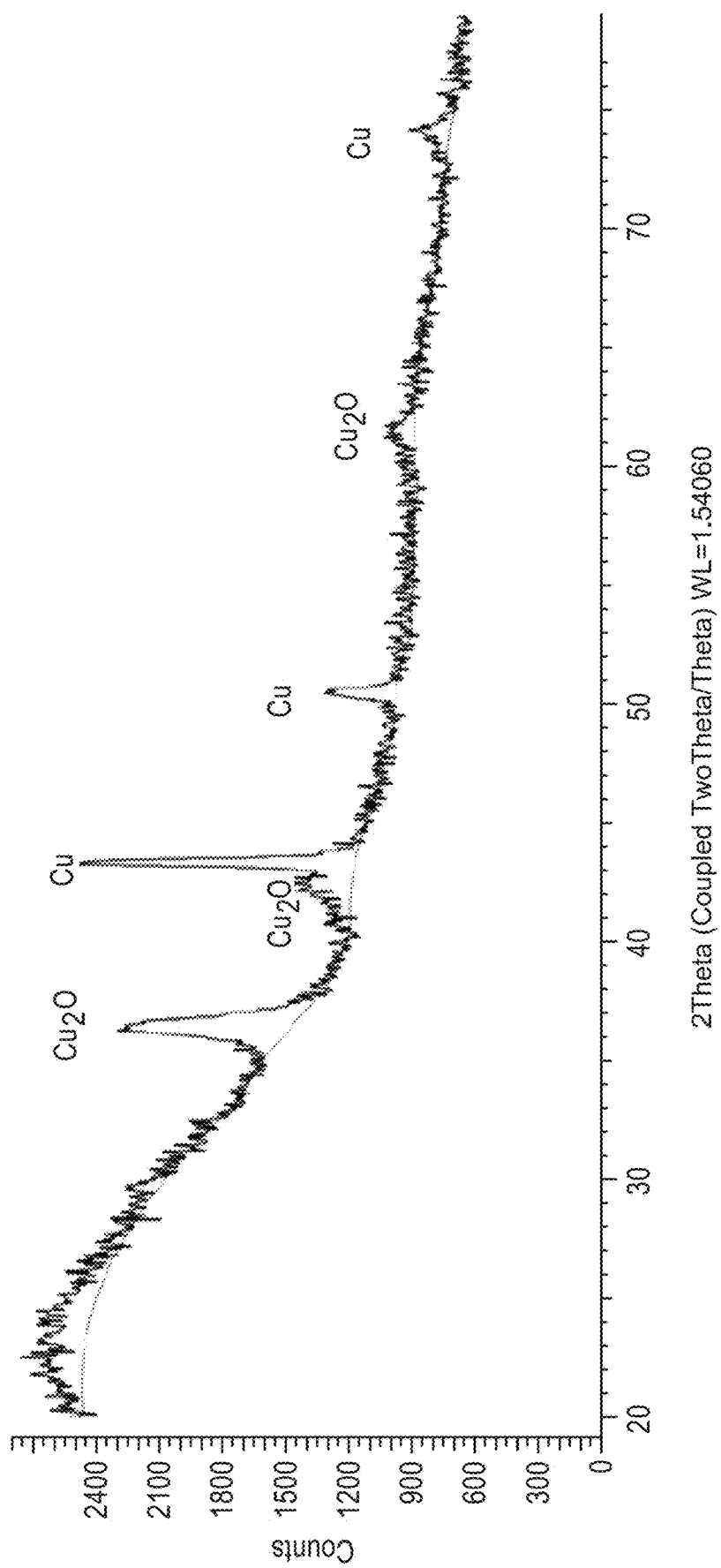

FIG. 3 shows an X-ray powder diffractogram corresponding to the nanoparticles obtained in Example 2a. As can be seen by the diffractogram, after only 15 minutes, at least a portion of the copper nanoparticles have been oxidized to form solid $Cu_2O$ nanoparticles.

Example 2b: Partial Oxidation of Copper Nanoparticles

The remaining solution from Example 2a continued to stir for another 15 minutes (i.e., 30 minutes total). Another aliquot was then removed, centrifuged, the supernatant was discarded, and the resulting nanoparticles were washed with ethanol twice.

Figure 4:
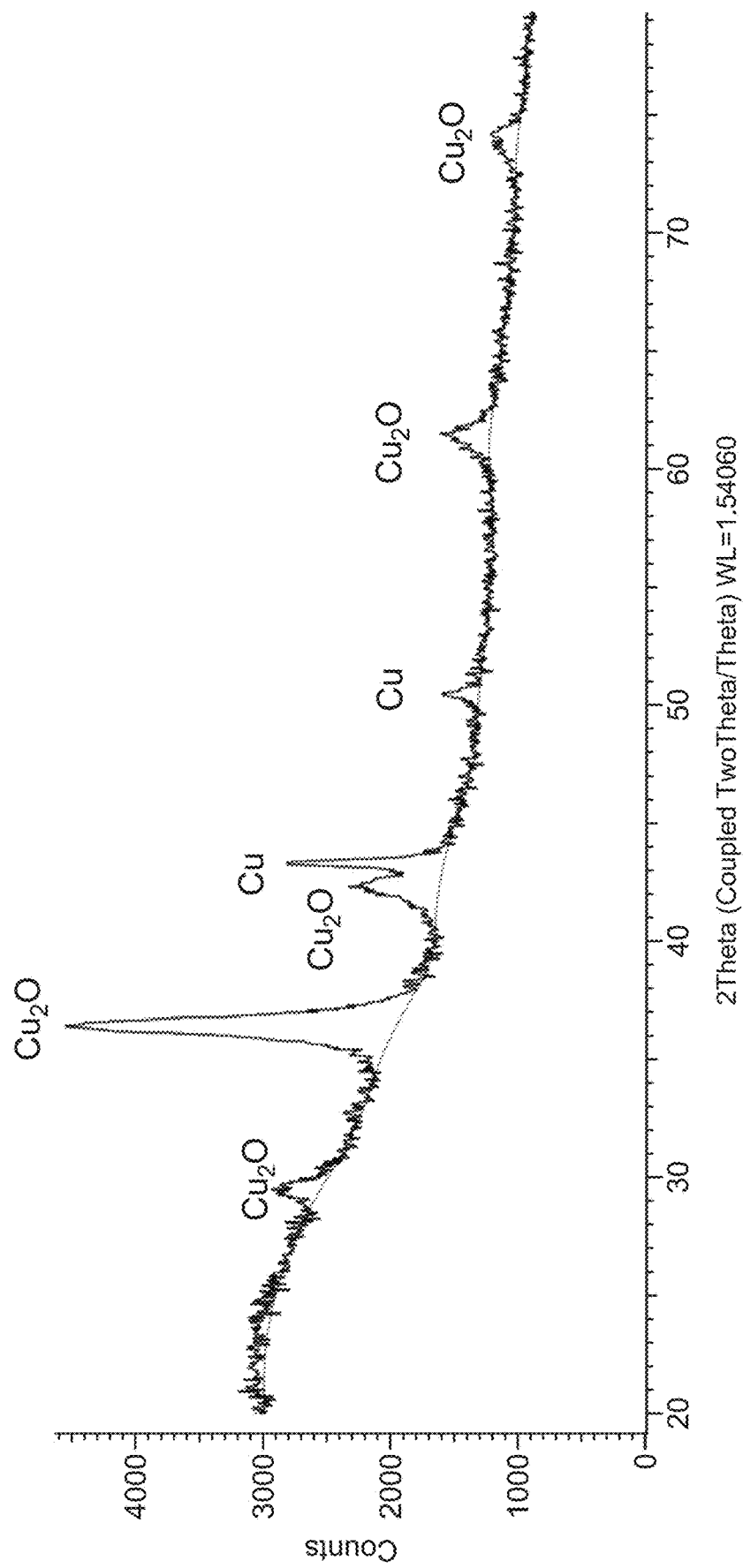
FIG. 4 shows an X-ray powder diffractogram corresponding to the nanoparticles obtained in Example 2b.

FIG. 4 shows an X-ray powder diffractogram corresponding to the nanoparticles obtained in Example 2b. As can be seen by the diffractogram, after 30 minutes, more of the copper nanoparticles have been oxidized to form solid $Cu_2O$ nanoparticles.

Example 2c: Partial Oxidation of Copper Nanoparticles

The remaining solution from Example 2b continued to stir for another 15 minutes (i.e., 45 minutes total). Another aliquot was then removed, centrifuged, the supernatant was discarded, and the resulting nanoparticles were washed with ethanol twice.

Figure 5:
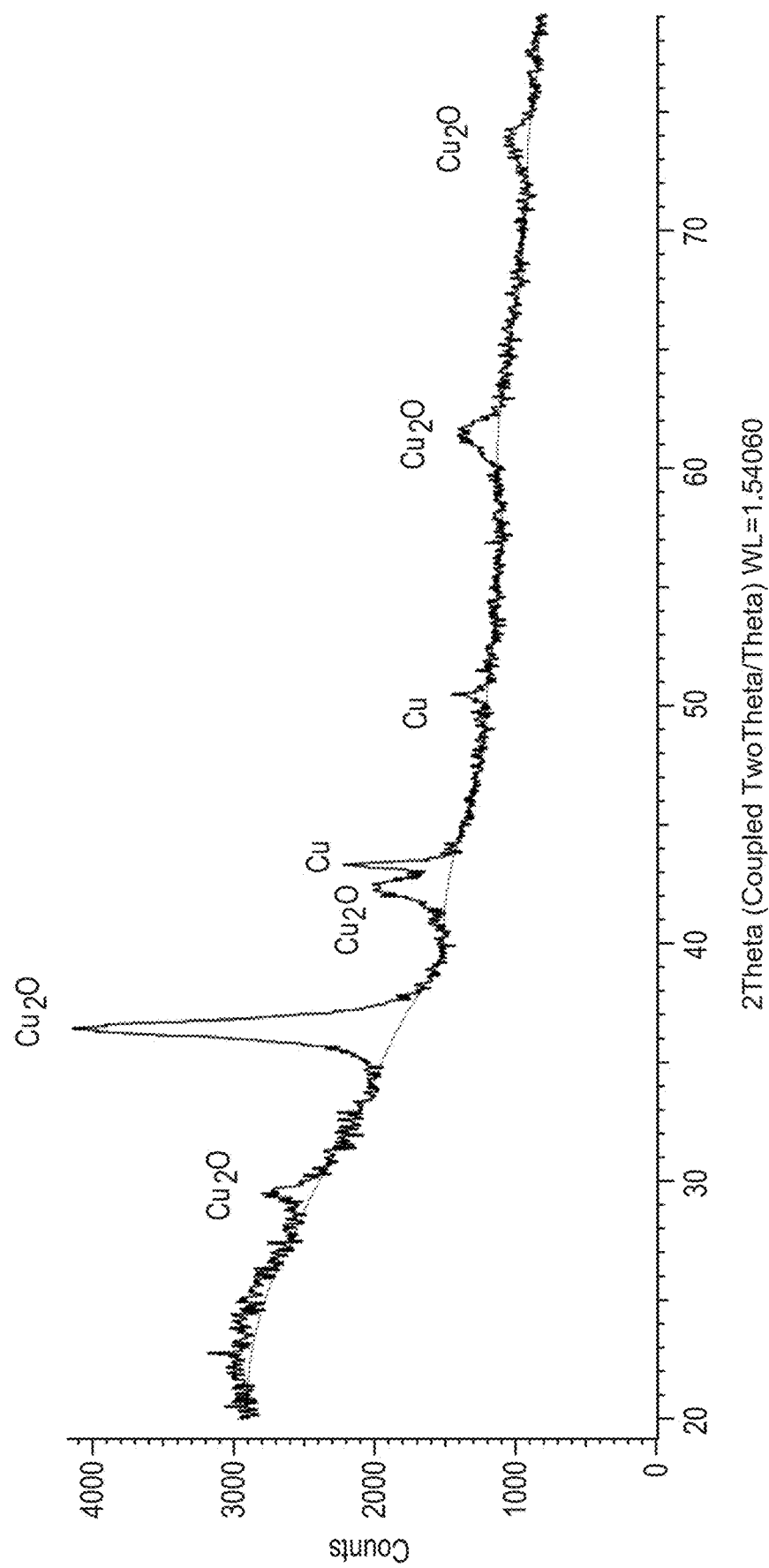
FIG. 5 shows an X-ray powder diffractogram corresponding to the nanoparticles obtained in Example 2c.

FIG. 5 shows an X-ray powder diffractogram corresponding to the nanoparticles obtained in Example 2c. As can be seen by the diffractogram, after 45 minutes, even more of the copper nanoparticles have been oxidized to form solid $Cu_2O$ nanoparticles.

Example 2d: Complete Oxidation of Copper Nanoparticles Having Artificial Hollow Shape The remaining solution from Example 2c continued to stir for another 15 minutes (i.e., 60 minutes total). Another aliquot was then removed, centrifuged, the supernatant was discarded, and the resulting nanoparticles were washed with ethanol twice.

Figure 6:
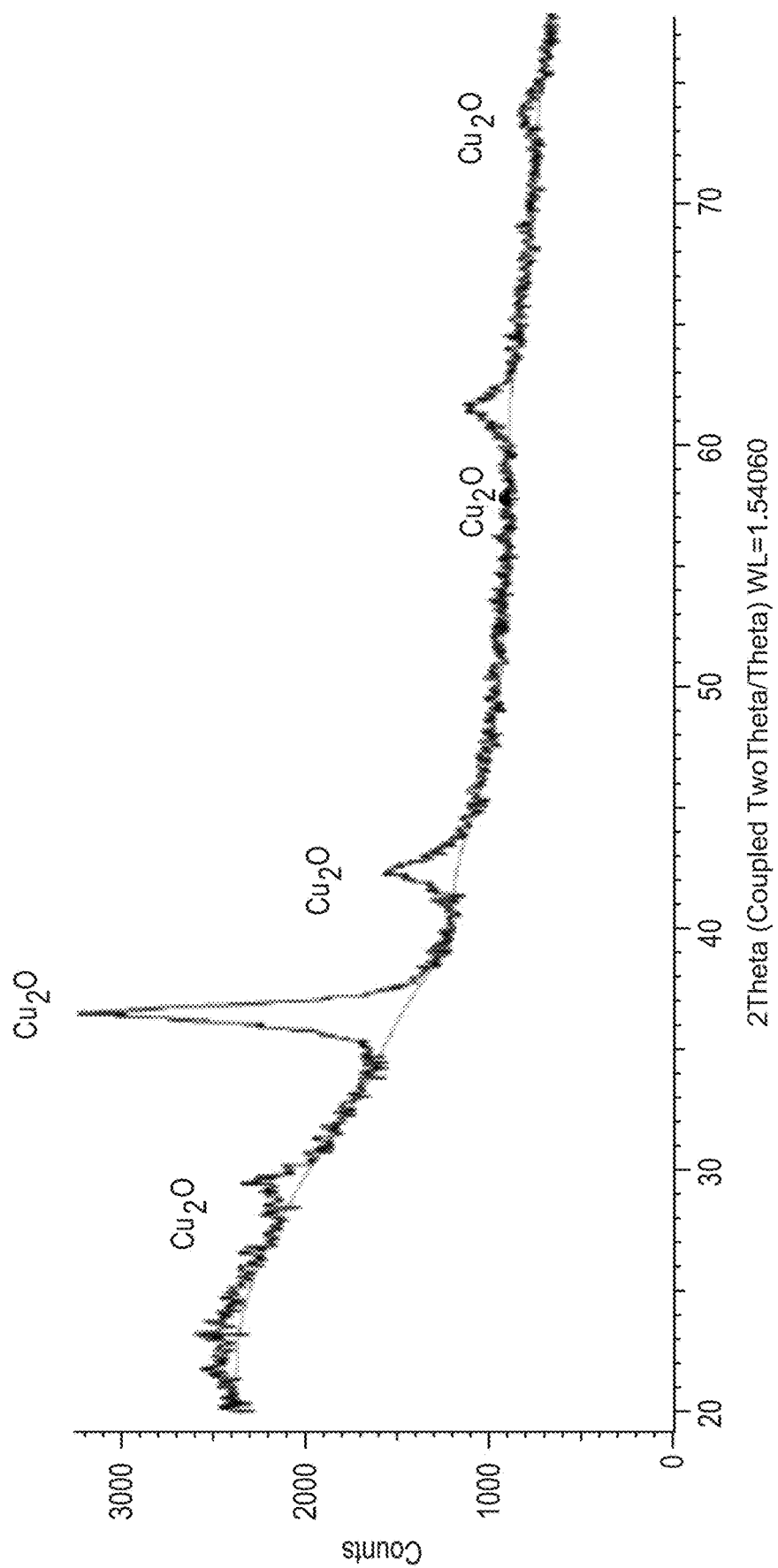
FIG. 6 shows an X-ray powder diffractogram corresponding to the nanoparticles obtained in Example 2d.

FIG. 6 shows an X-ray powder diffractogram corresponding to the nanoparticles obtained in Example 2d. As can be seen by the diffractogram, after 60 minutes, all of the copper nanoparticles have been oxidized to form solid $Cu_2O$ nanoparticles. Next, 0.5 mmol of CTAB was introduced to the $Cu_2O$ solution.

Figure 7:
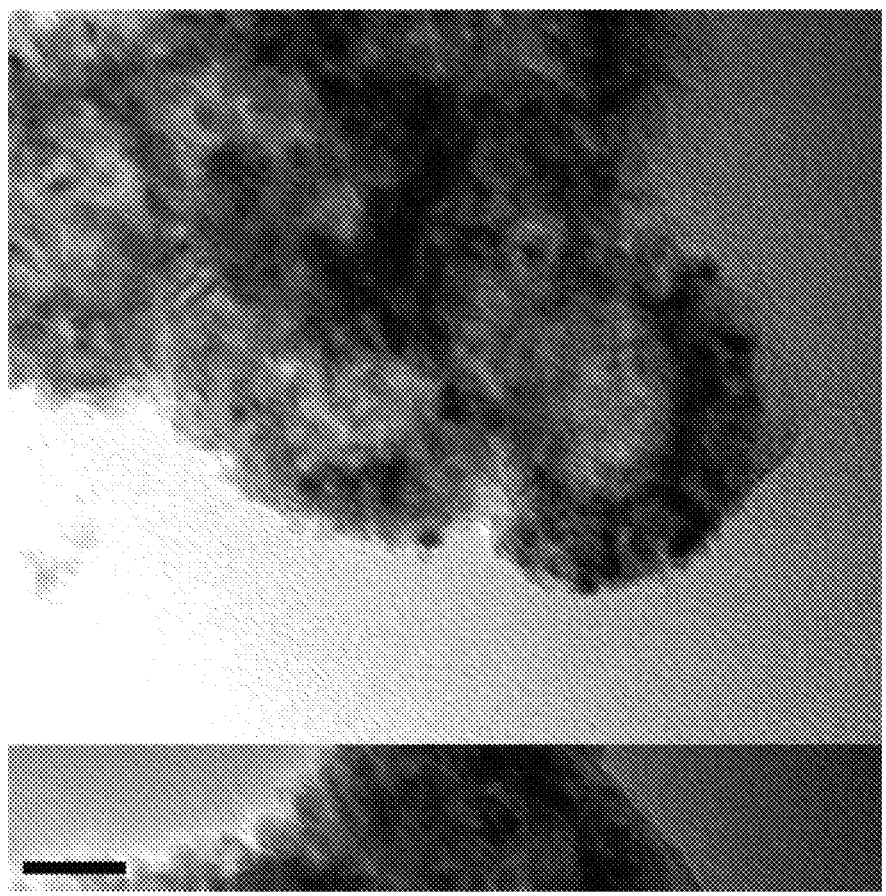
FIG. 7 shows a transmission electron microscopy (TEM) image of the $Cu_2O$ nanoparticles obtained in Example 2d.

FIG. 7 shows a TEM image of the $Cu_2O$ nanoparticles obtained in Example 2d following addition of the 0.5 mmol of CTAB to the $Cu_2O$ solution. As can be seen by the image, the solid $Cu_2O$ nanoparticles together form an artificial hollow shape, wherein each individual $Cu_2O$ nanoparticle has a diameter of about 7 nm. The artificial hollow shape formation is likely due to the nature of CTAB molecule (micelle formation).

Example 3: Further Oxidation of Copper Oxide Nanoparticles

Copper nanoparticles (about 100 mg) made using the method in Example 1 were redispersed in an aqueous agent consisting of only water (100 mL) at 23° C. The solution was stirred for 24 hours.

Figure 8:
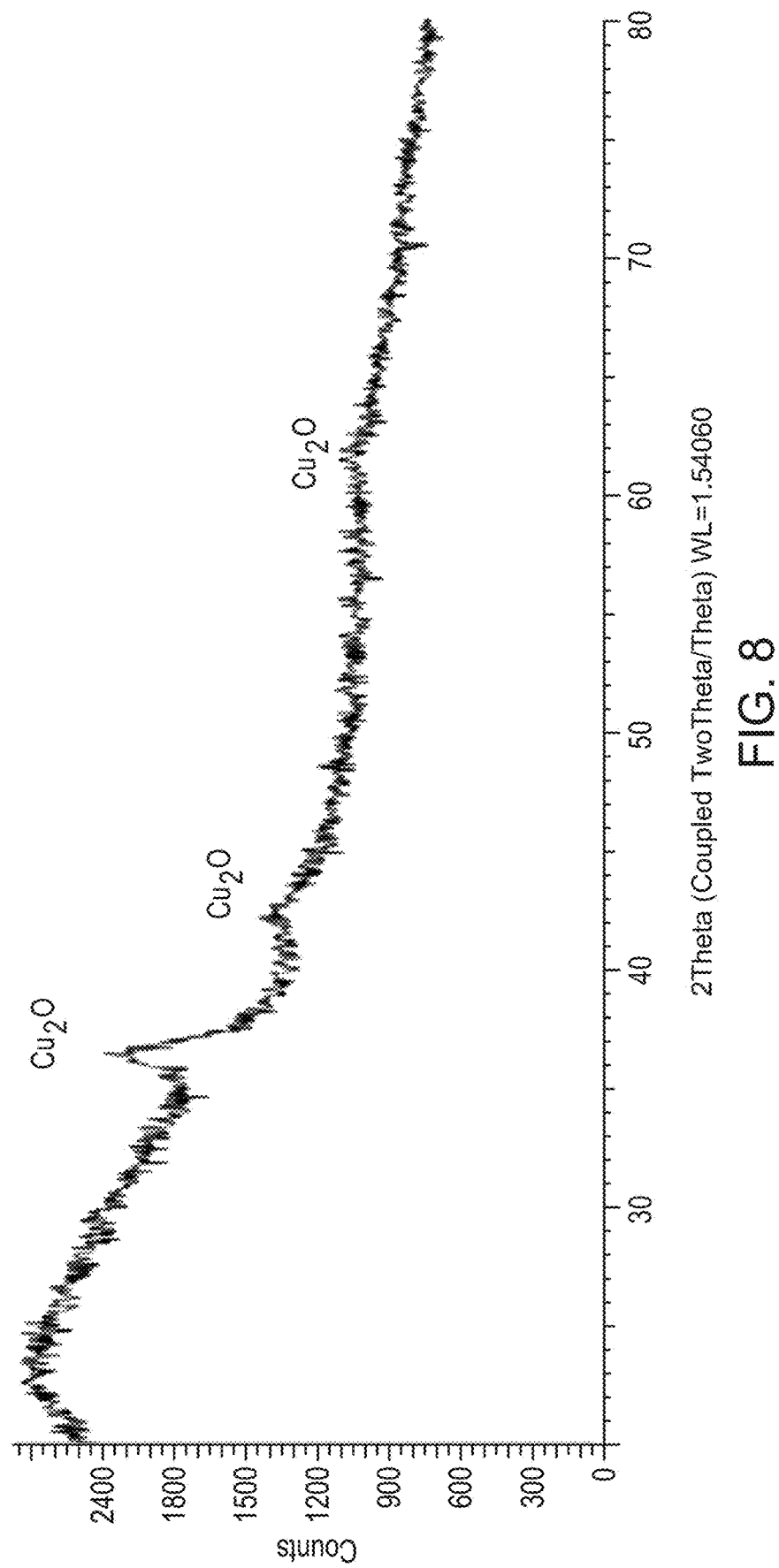
FIG. 8 shows an X-ray powder diffractogram corresponding to the nanoparticles obtained in Example 3.

FIG. 8 shows an X-ray powder diffractogram corresponding to the nanoparticles obtained in Example 3. As can be seen by the diffractogram, after 24 hours, all of the copper nanoparticles have been oxidized to form solid $Cu_2O$ nanoparticles.

Figure 9:
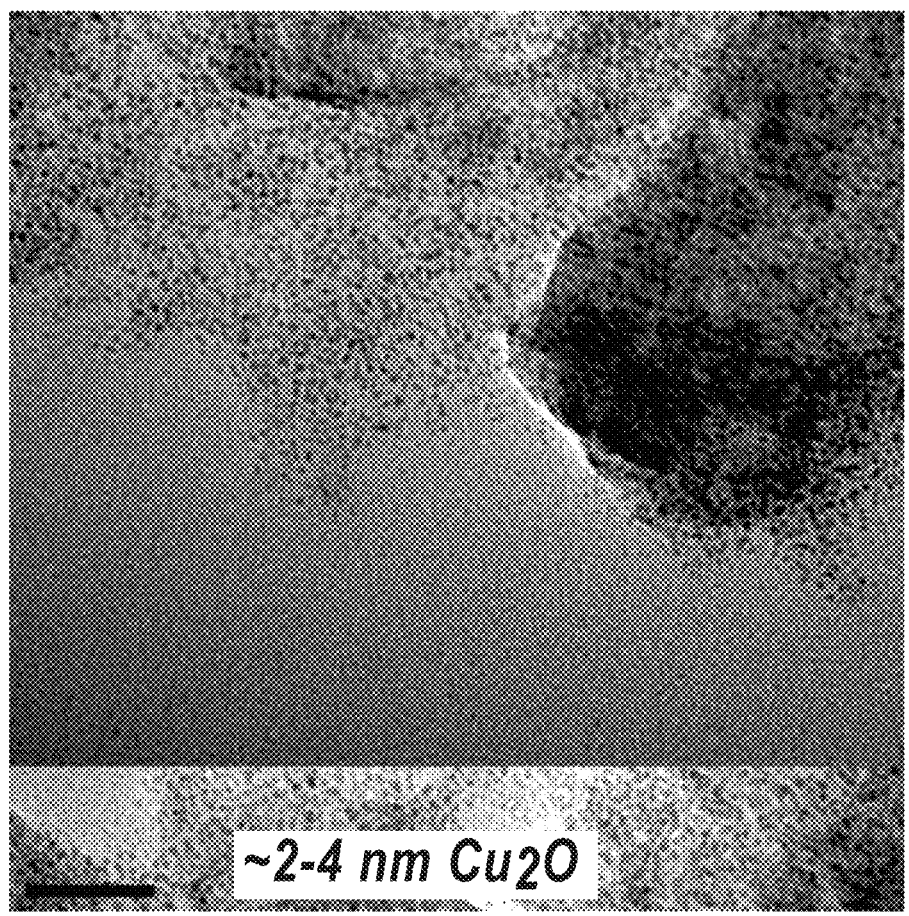
FIG. 9 shows a TEM image of the $Cu_2O$ nanoparticles obtained in Example 3.

FIG. 9 shows a TEM image of the $Cu_2O$ nanoparticles obtained in Example 3. As can be seen by the figure, the $Cu_2O$ nanoparticles are solid and dispersed. In addition, each individual $Cu_2O$ nanoparticle has a diameter of from about 2-4 nm.

Accordingly, the solid copper nanoparticles made according to Example 1 having a diameter of about 50 nm can be oxidized and fragmented to form solid $Cu_2O$ nanoparticles having a particle size of about 7 nm. The 7 nm $Cu_2O$ nanoparticles can be further fragmented by extending the amount of time in water. For example, the 7 nm $Cu_2O$ solid nanoparticles can be further fragmented to solid $Cu_2O$ nanoparticles having a particle size of about 2-4 nm by stirring in water for 24 hours.

Example 4a: Partial Oxidation of Copper Nanoparticles in Air

Copper nanoparticles (about 100 mg) made using the method in Example 1 were exposed to air at 23° C. for one hour.

Figure 10:
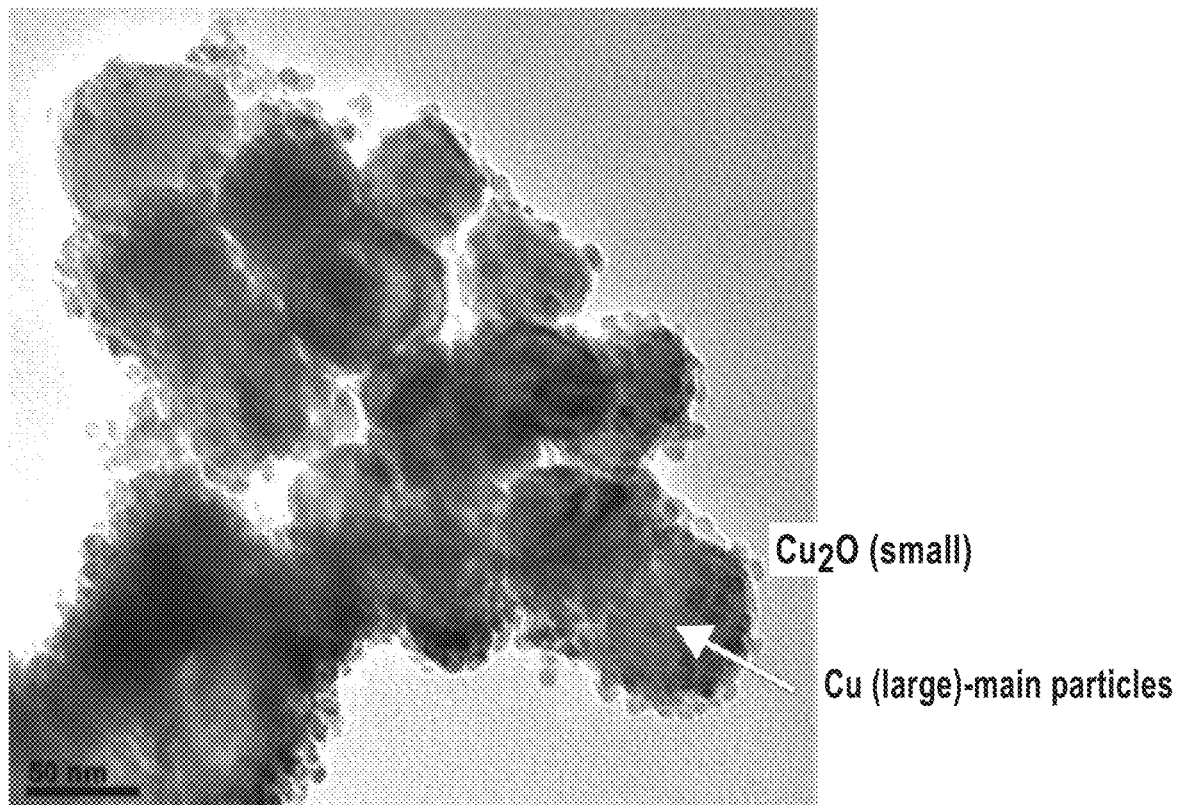

FIG. 10 shows a TEM image of the nanoparticles obtained in Example 4a. As can be seen by the figure, at least a portion of the copper nanoparticles have been oxidized to form solid $Cu_2O$ nanoparticles. Specifically, the figure shows both larger (i.e., having a diameter of about 50 nm) solid copper nanoparticles and smaller (i.e., having a diameter of about 7 nm) solid $Cu_2O$ nanoparticles.

Without being limited to any particular theory, solid $Cu_2O$ nanoparticles having a particle size of about 7 nm form via fragmentation/oxidation of the solid $Cu_2O$ nanoparticles having a particle size of about 50 nm. This oxidation behavior appears to be consistent with oxidation in water except that the rate of oxidation in water is faster, likely due to dispersion of the copper nanoparticle in water with stirring.

Example 4b: Oxidation of Copper Nanoparticles in Air

Copper nanoparticles (about 100 mg) made using the method in Example 1 were exposed to air at 23° C. for 4 or 9 days.

Figure 11A:
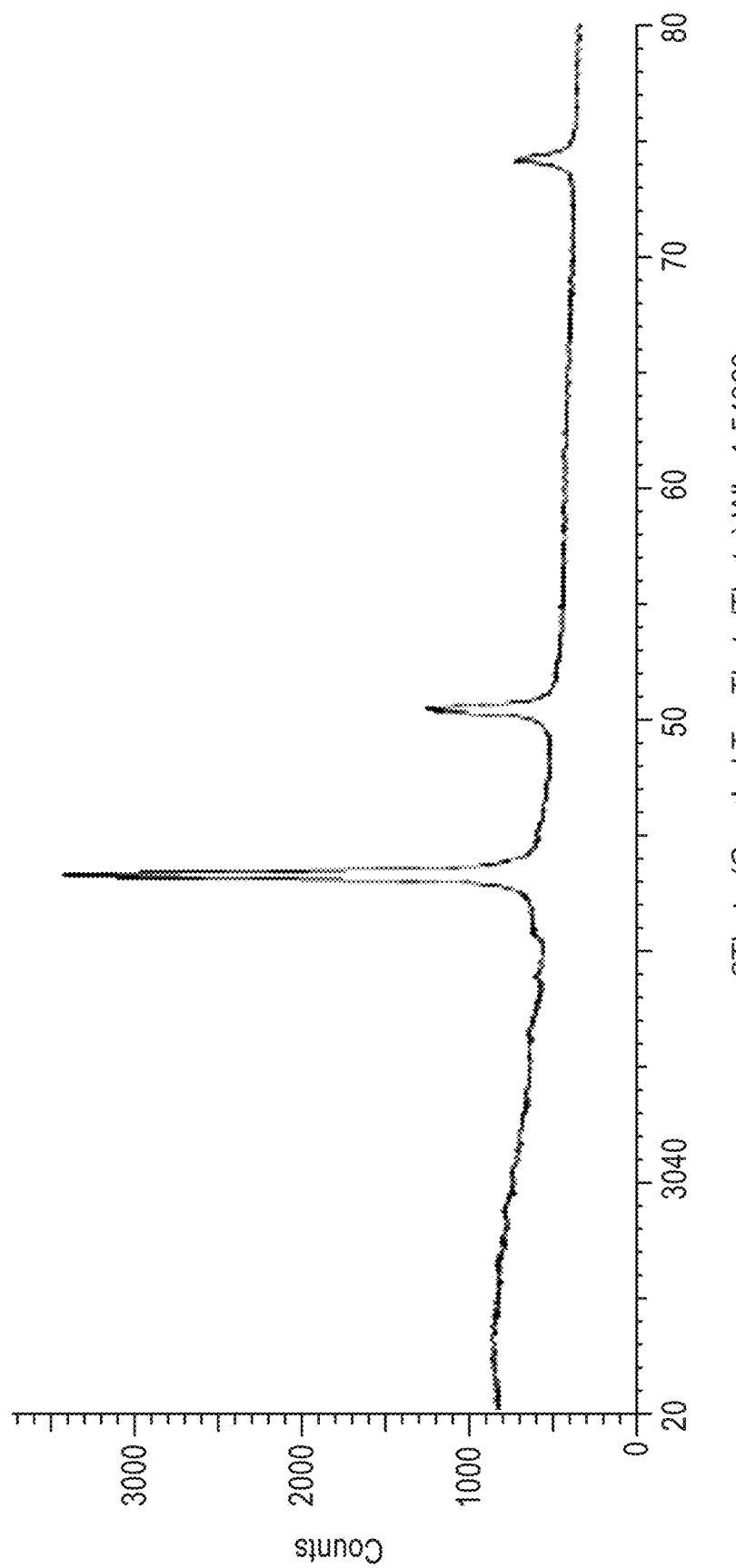
FIGS. 11a and 11b show a comparison of the X-ray powder diffractograms corresponding to various time points studied in Example 4b.
Figure 11B:
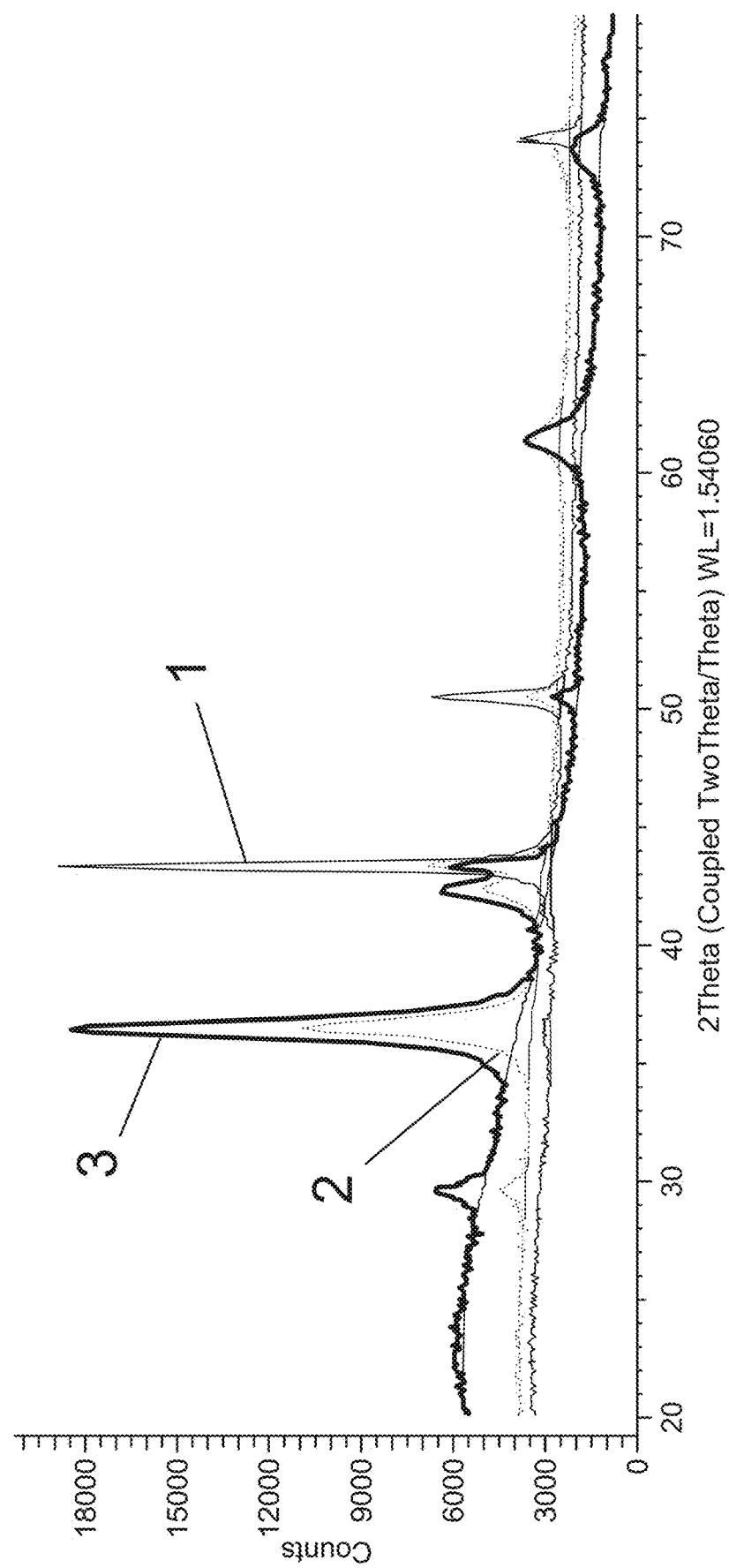

FIGS. 11a and 11b show a comparison of the X-ray powder diffractograms corresponding to various time points studied in Example 4b. Specifically, FIG. 11a shows the X-ray powder diffractogram corresponding to the copper nanoparticles prior to air exposure. FIG. 11b shows an overlay of the X-ray powder diffractograms corresponding the copper nanoparticles prior to air exposure (1), the nanoparticles after 4 days of air exposure (2), and the nanoparticles after 9 days of air exposure (3). It was determined that exposure to air provides $Cu_2O$ nanoparticles similar to those obtained when contacting metal nanoparticles with an aqueous agent, although the oxidation in air occurs at a much slower rate.

Moreover, Examples 4a and 4b indicated that the copper nanoparticles of Example 1 are readily oxidized to $Cu_2O$, providing a facile formation of $Cu_2O$ nanoparticles with well-shaped and distinct structures.

Comparative Example 1: Synthesis of Copper Nanoparticles

Hydrazine hydrate (50-60%, 3 mL, 0.43 M) was added to a stirring solution of polyvinylpyrrolidone (PVP) (55,000 unit weight, about 5 mmol) in water (75 mL, DI) under argon at 23° C. to provide a reducing agent solution. The reducing agent solution was allowed to age for 20 minutes under argon. $NH_4OH$ (0.5 mL, 14.5 M) was added to a solution of $Cu(NO_3)_2 \cdot 2.5H_2O$ (0.465 g, 2 mmol) and PVP (5 mmol) in water (75 mL, DI) to provide a metal precursor solution.

The metal precursor solution was immediately poured into the reducing agent solution and this mixture was stirred under argon for 2 hours. The resulting copper nanoparticles were isolated via centrifuge (12,000 rpm for 5 minutes), the supernatant was discarded, and the copper nanoparticles were washed with ethanol twice. The resulting copper nanoparticles were solid and had a diameter of about 50 nm.

Figure 12A:
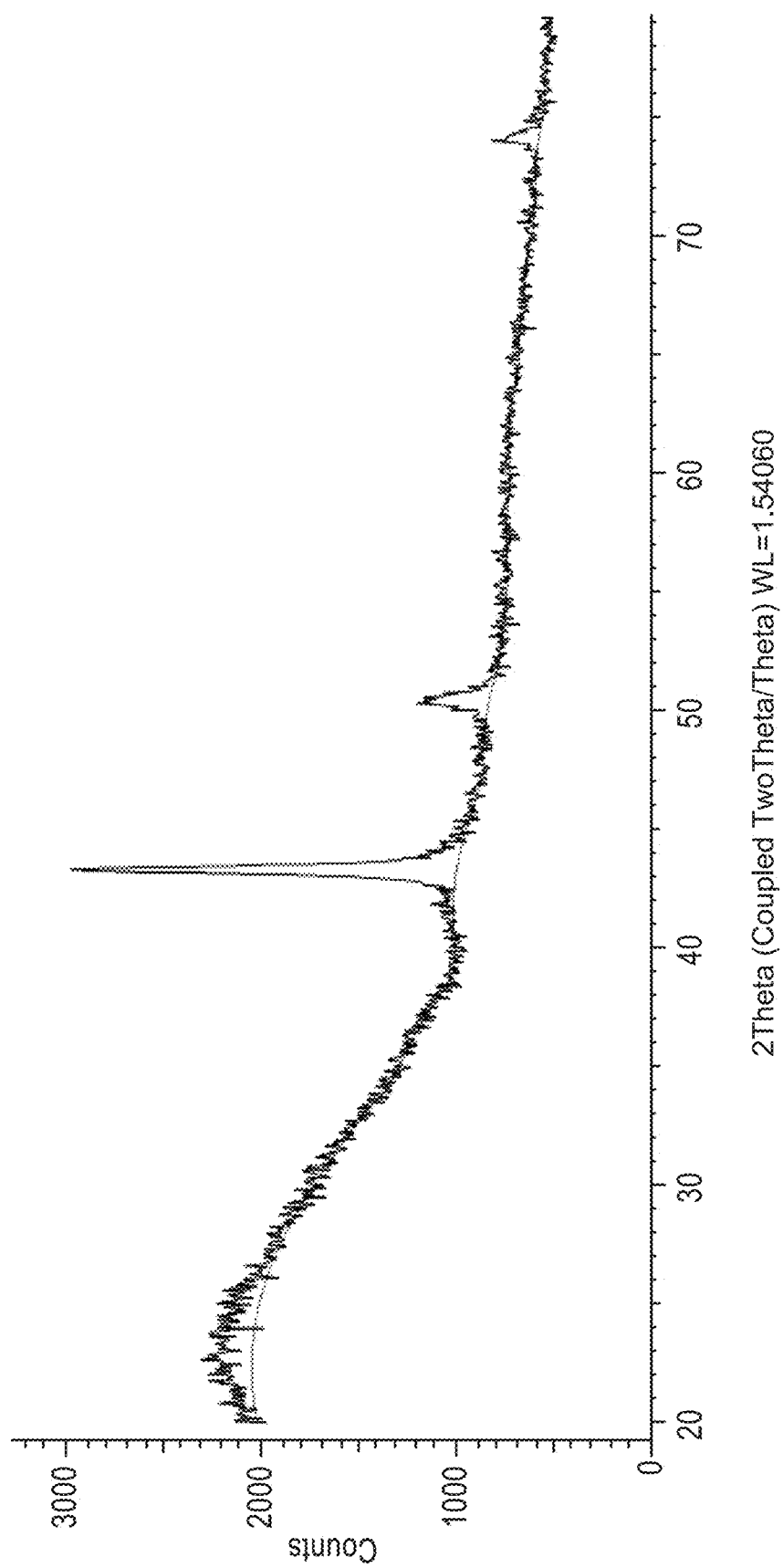
FIG. 12a shows an X-ray powder diffractogram corresponding to the copper nanoparticles synthesized according to Comparative Example 1.
Figure 12B:
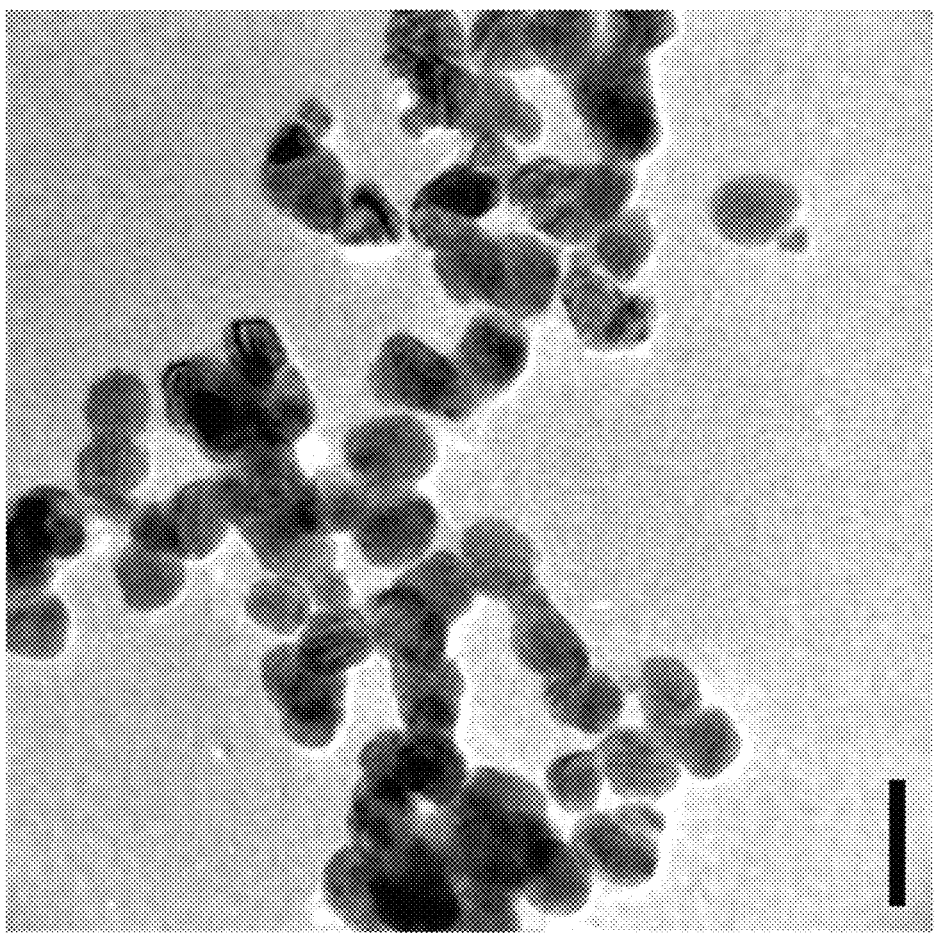
FIG. 12b shows a TEM image of the nanoparticles obtained in Comparative Example 1.

FIG. 12a shows an X-ray powder diffractogram corresponding to the copper nanoparticles synthesized according to Comparative Example 1. FIG. 12b shows a TEM image of the nanoparticles obtained in Comparative Example 1.

Comparative Example 2: Copper Nanoparticles and Air

A dry sample of the copper nanoparticles (about 100 mg) obtained in Comparative Example 1 were exposed to air at 23° C. for up to 4 days.

Figure 13A:
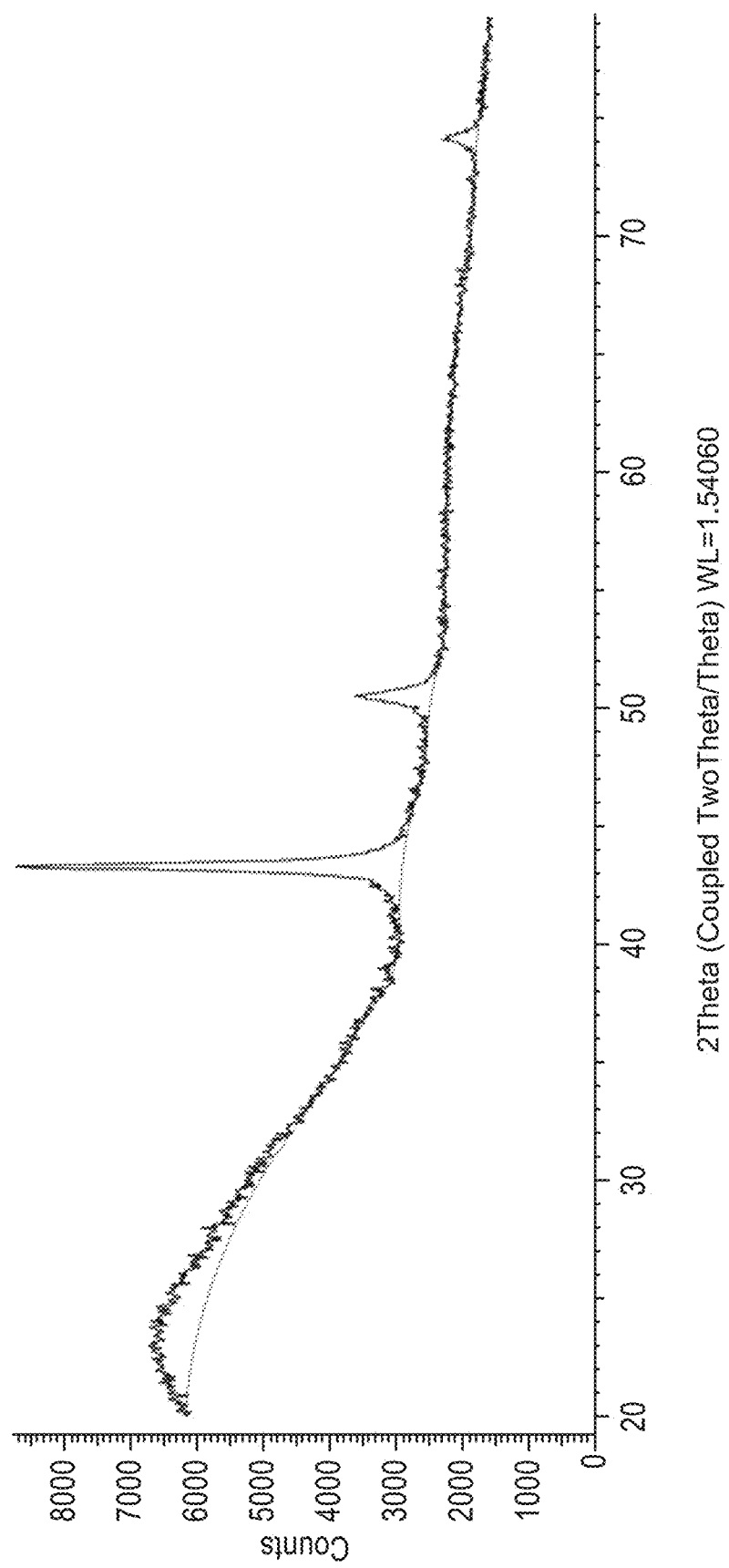
FIG. 13a shows an X-ray powder diffractogram corresponding to the nanoparticles obtained in Comparative Example 2 after one day.
Figure 13B:
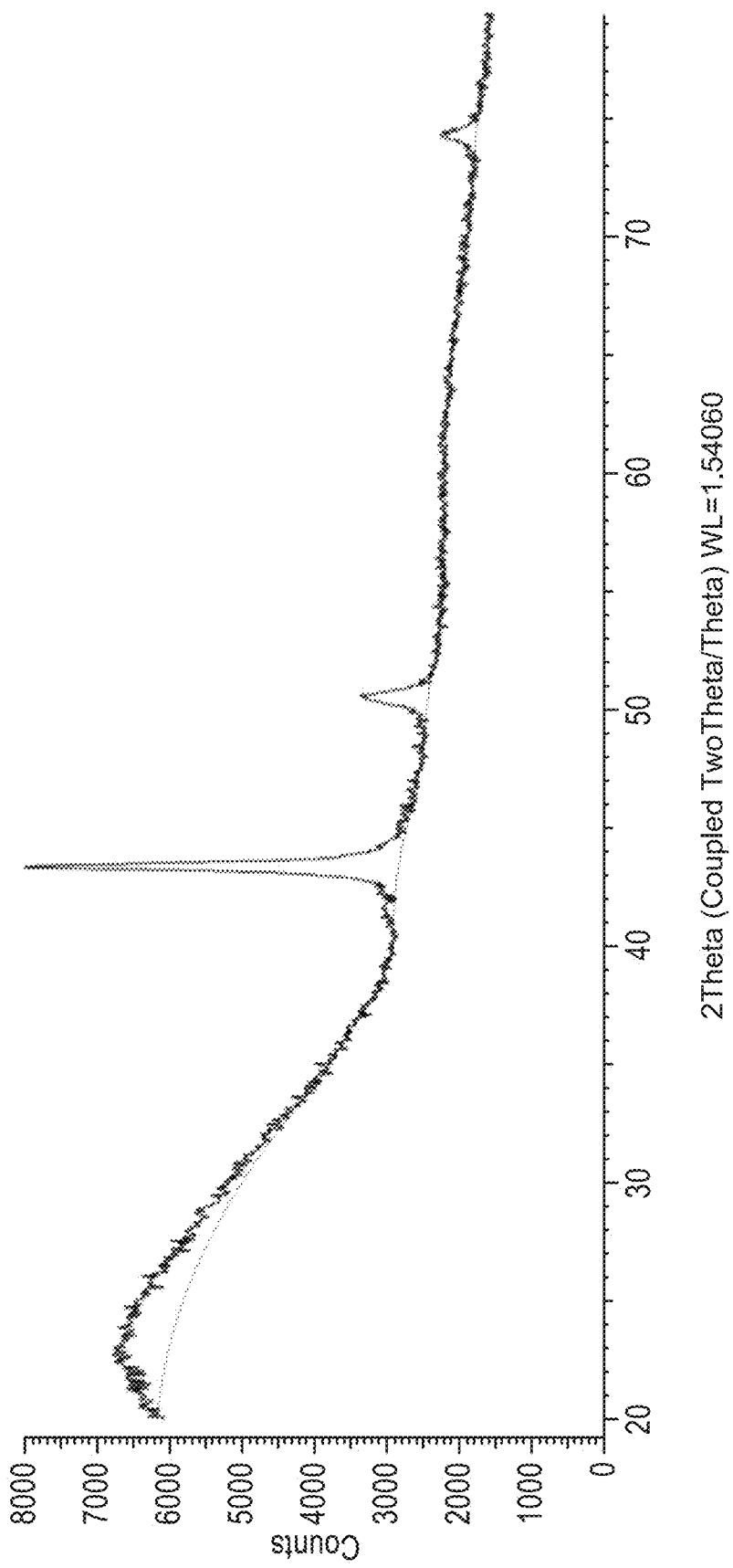
FIG. 13b shows an X-ray powder diffractogram corresponding to the nanoparticles obtained in Comparative Example 2 after four days.

FIGS. 13a and 13b show X-ray powder diffractograms corresponding to the nanoparticles obtained in Comparative Example 2 after 1 or 4 days, respectively. As can be seen by the diffractogram, even after 4 days, no bulk oxidation could be observed (i.e., no significant presence of $Cu_2O$ nanoparticles could be detected).

Comparative Example 3a: Copper Nanoparticles and Water

The copper nanoparticles (about 100 mg) obtained in Comparative Example 1 were redispersed in an aqueous agent consisting of water (100 mL) at 55° C. (It is noted that oxidation at room temperature was too slow to be observed.) The solution was stirred for 1 hour under air and then an aliquot was removed. The aliquot was centrifuged, the supernatant was discarded, and the resulting nanoparticles were washed with ethanol twice.

Figure 14:
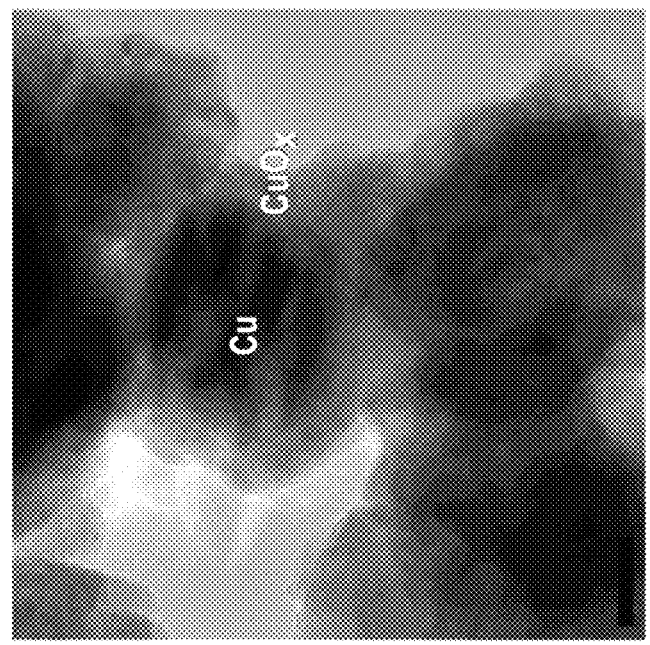
Figure 14:
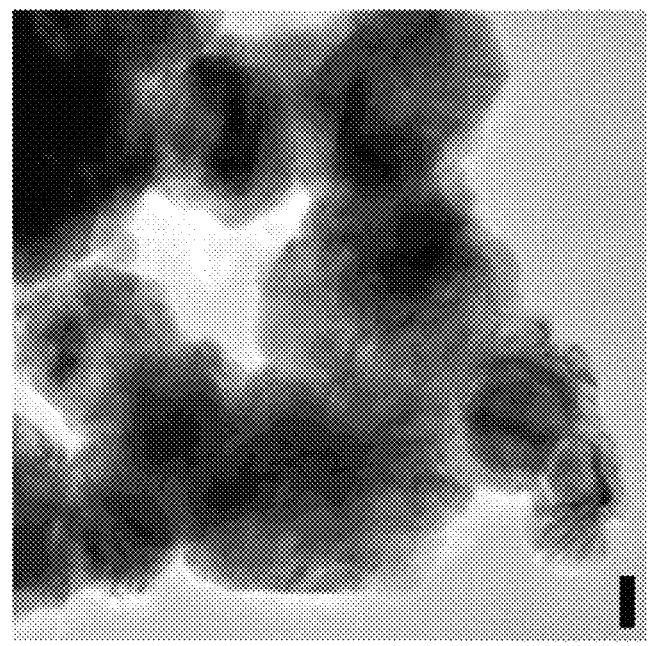

FIG. 14 shows TEM images of the nanoparticles obtained in Comparative Example 3a. As can be seen by the images, the solid copper nanoparticles do not appear to have reduced in size. Rather, the images show the formation core@shell nanoparticles with a Cu core and a $CuO_x$ shell, as is conventional in the art.

Figure 15:
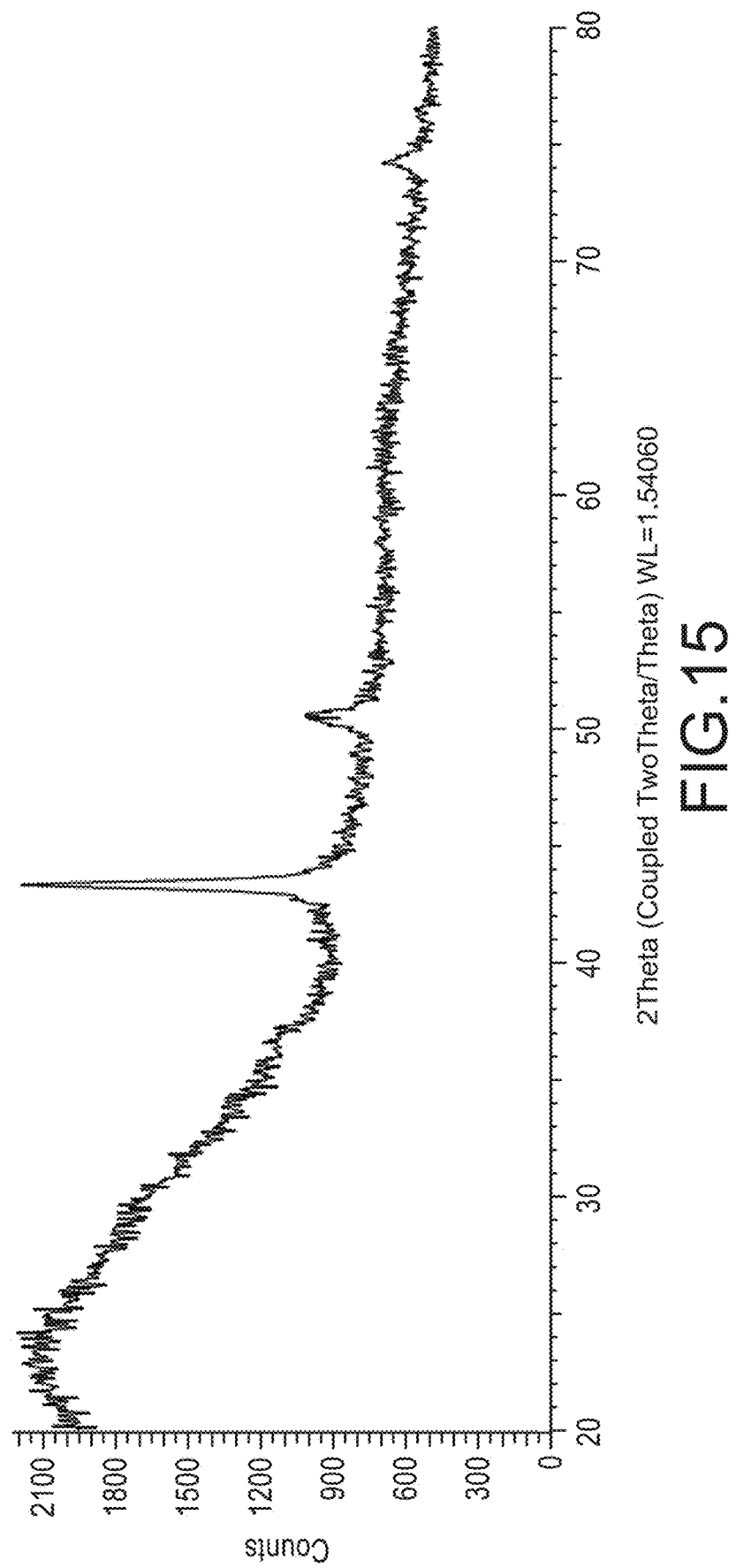

FIG. 15 shows an X-ray powder diffractogram corresponding to the nanoparticles obtained in Comparative Example 3a. This diffractogram confirms that no bulk oxidation of copper to $Cu_2O$ can be observed after one hour.

Comparative Example 3b: Copper Nanoparticles and Water

The remaining solution from Example 3b continued to stir for another hour (i.e., 2 hours total) at 55° C. Another aliquot was then removed, centrifuged, the supernatant was discarded, and the resulting nanoparticles were washed with ethanol twice.

Figure 16:
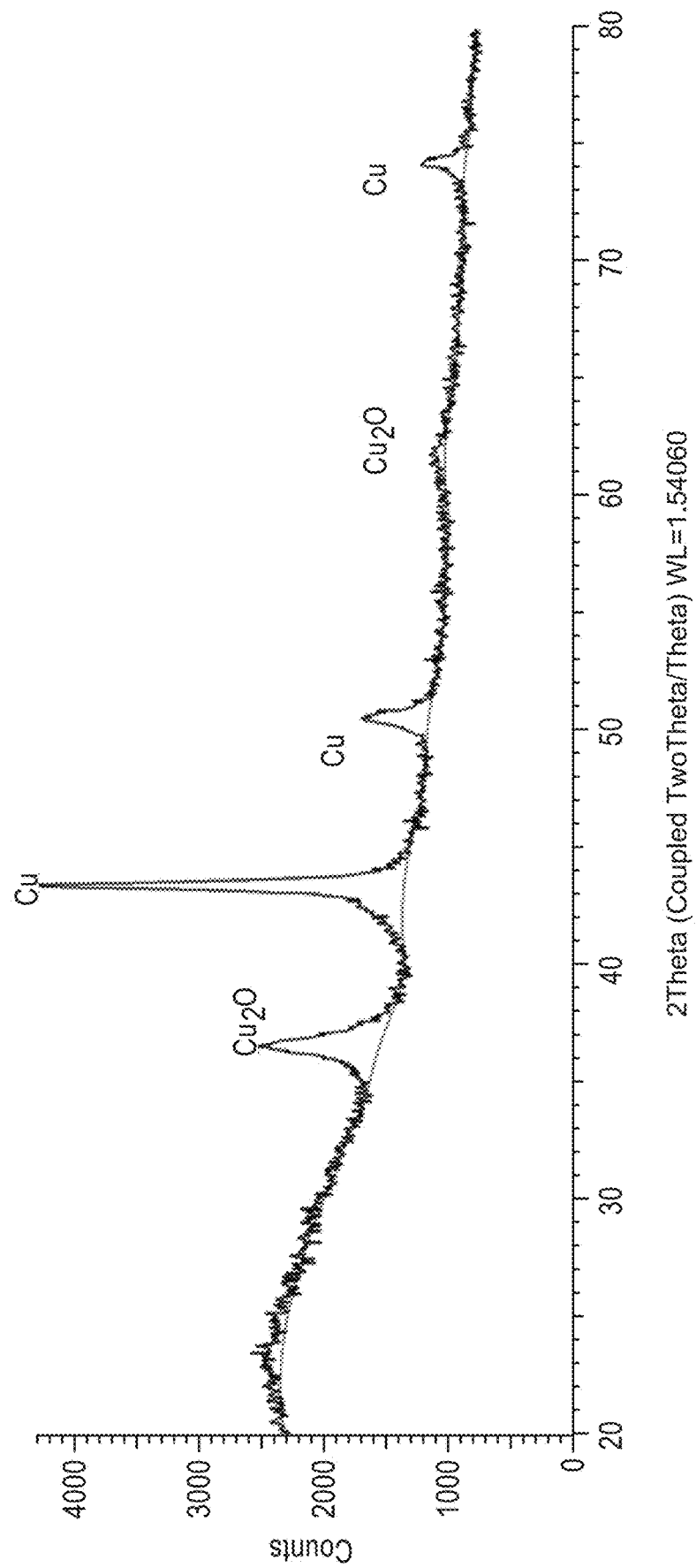
FIG. 16 shows an X-ray powder diffractogram corresponding to the nanoparticles obtained in Comparative Example 3b.

FIG. 16 shows an X-ray powder diffractograms corresponding to the nanoparticles obtained in Comparative Example 3b. This diffractogram shows a mixture $Cu_2O$ and Cu nanoparticles.

Figure 17:
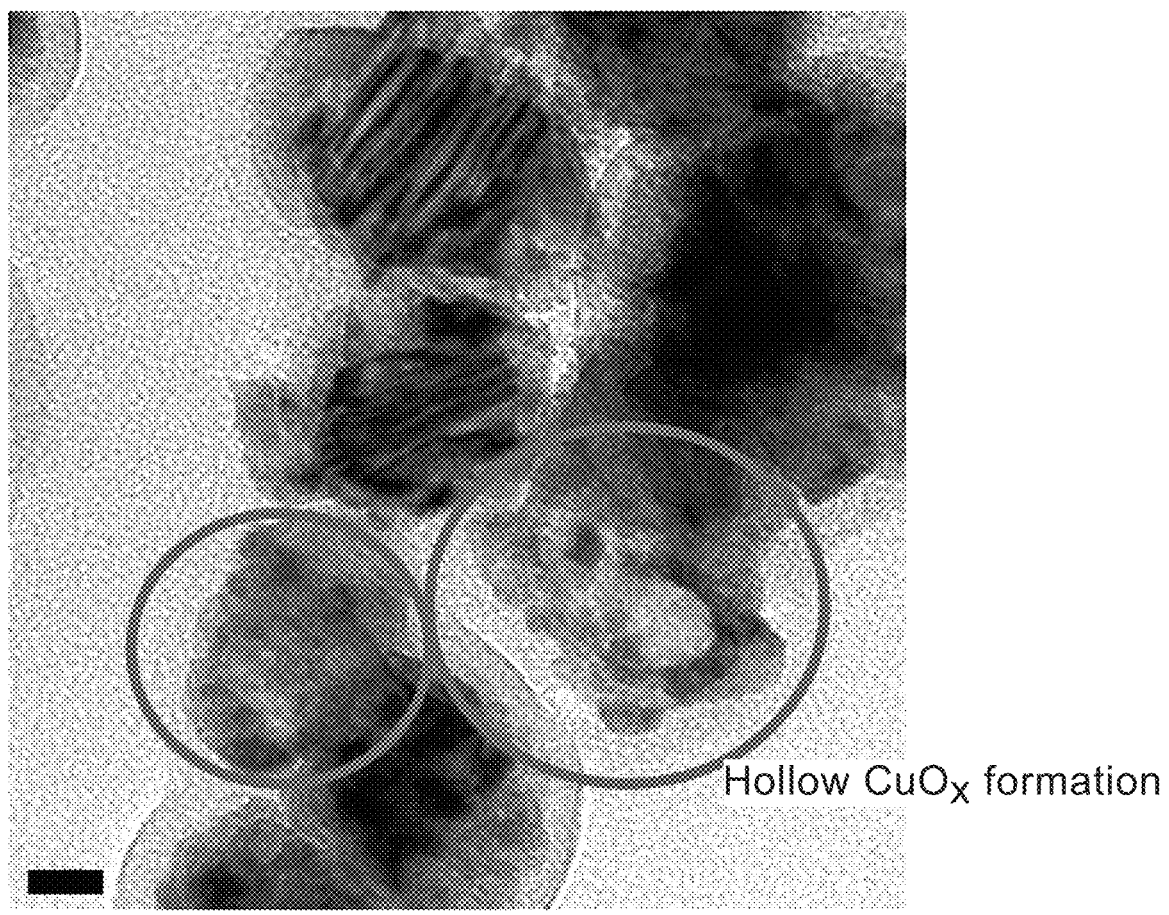
FIG. 17 shows a TEM image of the nanoparticles obtained in Comparative Example 3b.

FIG. 17 shows a TEM image of the nanoparticles obtained in Comparative Example 3b. As can be seen by the image, the solid copper nanoparticles do not appear to have reduced in size. Moreover, the nanoparticles appear to be a mixture of hollow $CuO_x$ nanoparticles and nanoparticles having a core@shell morphology.

Comparative Example 3c: Copper Nanoparticles and Water

The remaining solution from Example 3b continued to stir for another 4 hours (i.e., 6 hours total) at 55° C. Another aliquot was then removed, centrifuged, the supernatant was discarded, and the resulting nanoparticles were washed with ethanol twice.

Figure 18A:
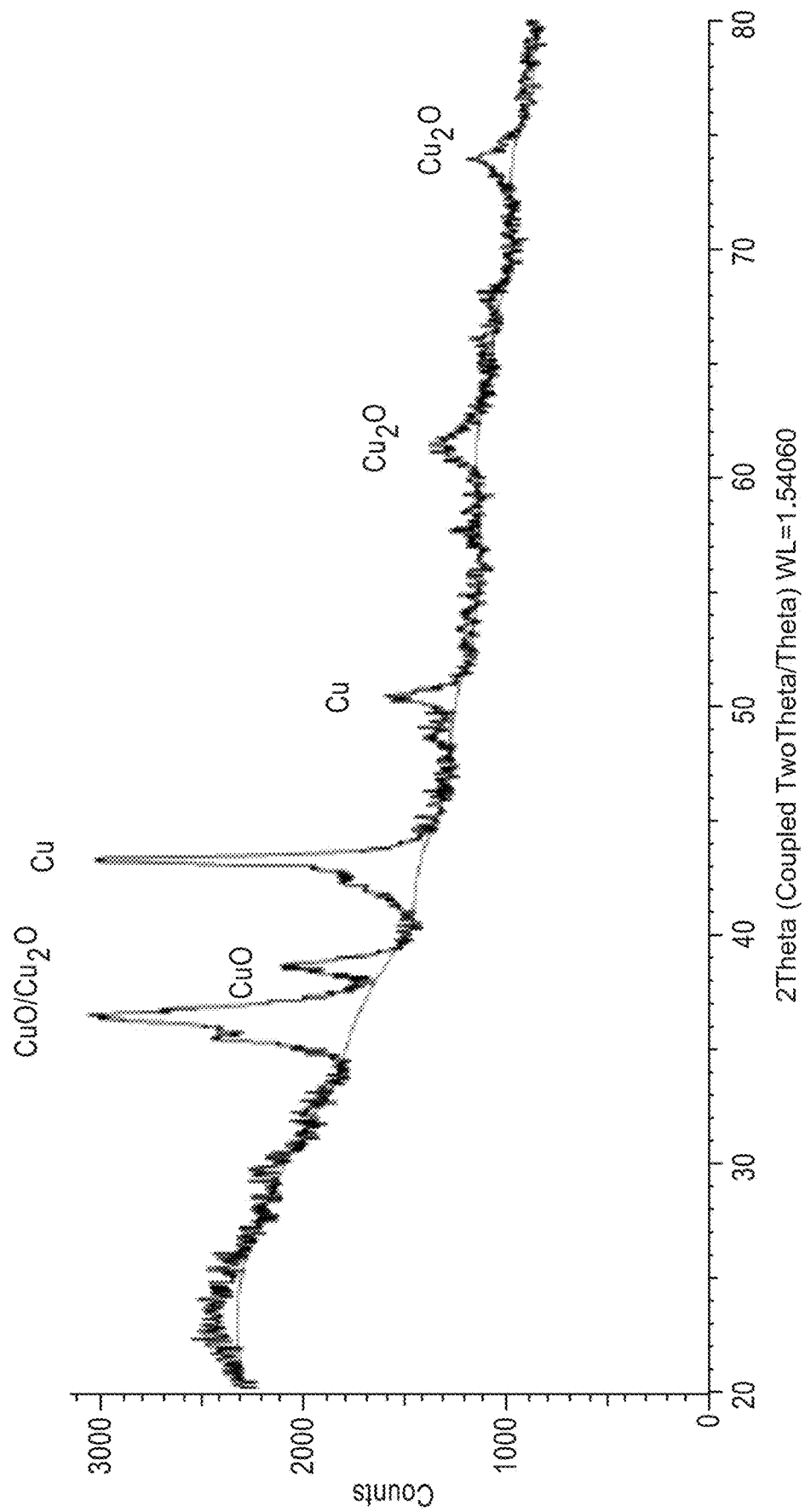
FIG. 18a shows an X-ray powder diffractogram corresponding to the nanoparticles obtained in Comparative Example 3c.
Figure 18B:
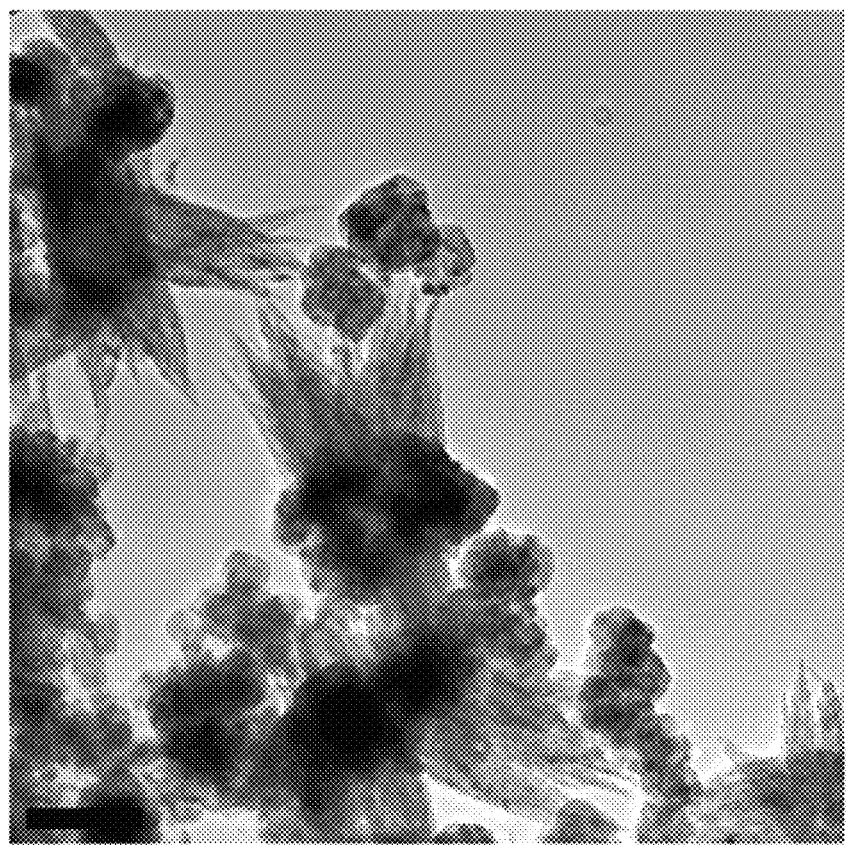
FIG. 18b shows a TEM image of the nanoparticles obtained in Comparative Example 3c.

FIG. 18a show an X-ray powder diffractogram corresponding to the nanoparticles obtained in Comparative Example 3c. This diffractogram shows a mixture of CuO, $Cu_2O$, and Cu nanoparticles. FIG. 18b shows a TEM image of the nanoparticles obtained in Comparative Example 3c. As can be seen by the image, some of the solid copper nanoparticles appear to have hollowed out without fracturing or otherwise forming distinct particles. Further, a needle-like morphology of CuO nanoparticles is also present.

What is claimed is:

1. A method for preparing solid metal oxide nanoparticles, the method comprising:
    combining a metal precursor solution and a reducing agent solution, wherein:
    the metal precursor solution comprises a metal component, a stabilizer, and water,
    the reducing agent solution comprises a reducing agent, a stabilizer, and water, and
    the reducing agent solution has been aged from about 5 minutes to 2 hours prior to combining the metal precursor solution and the reducing agent solution;
    stirring the combined metal precursor solution and reducing agent solution to provide a plurality of metal nanoparticles having a first particle size;
    reducing the first particle size of at least a portion of the plurality of metal nanoparticles to a second particle size via a size reduction step consisting essentially of contacting and optionally stirring the plurality of metal nanoparticles with an aqueous agent to provide solid metal oxide nanoparticles having the second particle size; and
    removing the metal oxide nanoparticles from the aqueous agent,
    wherein the second particle size is smaller than the first particle size.

2. The method according to claim 1, wherein the metal comprises copper.

3. The method according to claim 2, wherein the metal oxide comprises $Cu_2O$.

4. The method according to claim 1, wherein the first particle size corresponds to a diameter of from about 25 to 75 nm.

5. The method according to claim 1, wherein the second particle size corresponds to a diameter of from about 1 to 10 nm.

6. The method according to claim 1, wherein the metal component comprises $Cu(NO_3)_2$ and/or hydrates thereof, and the stabilizer comprises CTAB.

7. The method according to claim 1, wherein the reducing agent comprises hydrazine hydrate and the stabilizer comprises CTAB and citric acid monohydrate.

8. The method according to claim 1, wherein the aqueous agent consists of water.

9. The method according to claim 1, wherein the aqueous agent consists of water and CTAB.

10. The method according to claim 1, wherein the solid metal oxide nanoparticles are arranged in an artificial hollow shape.

11. The method according to claim 1, wherein the plurality of metal nanoparticles are contacted with the aqueous agent for a predetermined contact time, the contact time being 1 hour.

12. The method according to claim 1, wherein the plurality of metal nanoparticles are contacted with the aqueous agent for a predetermined contact time, the contact time being 24 hours.

* * * * *